United States Patent
Shindo (10) Patent No.: US 7,289,416 B2
(45) Date of Patent: Oct. 30, 2007

(54) OPTICAL PICKUP AND OPTICAL DISK APPARATUS

(75) Inventor: Hiroyuki Shindo, Chofu (JP)

(73) Assignee: TEAC Corporation, Tokyo (JP)

( * ) Notice: Subject to any disclaimer, the term of this patent is extended or adjusted under 35 U.S.C. 154(b) by 667 days.

(21) Appl. No.: 10/329,640

(22) Filed: Dec. 24, 2002

(65) Prior Publication Data

US 2003/0117917 A1    Jun. 26, 2003

(30) Foreign Application Priority Data

Dec. 26, 2001    (JP) .............................. 2001-395364

(51) Int. Cl.
*G11B 7/00* (2006.01)

(52) U.S. Cl. .............................. 369/112.09; 369/112.28; 369/112.01

(58) Field of Classification Search ........... 369/112.16, 369/112.18, 112.21, 112.28

See application file for complete search history.

(56) References Cited

U.S. PATENT DOCUMENTS

| | | | |
|---|---|---|---|
| 6,084,845 A | | 7/2000 | Mizuno |
| 6,137,637 A * | | 10/2000 | Ju et al. ...................... 359/678 |
| 6,404,552 B1 * | | 6/2002 | Manabe ...................... 359/487 |
| 6,477,130 B2 * | | 11/2002 | Takahashi ............... 369/112.28 |
| 6,529,454 B1 * | | 3/2003 | Asoma et al. ............ 369/44.12 |
| 6,560,188 B1 * | | 5/2003 | Kyoya et al. ........... 369/112.03 |
| 6,747,939 B2 * | | 6/2004 | Saitoh et al. ................ 369/121 |
| 6,751,175 B1 * | | 6/2004 | Maeda et al. ............ 369/53.19 |
| 6,831,886 B1 * | | 12/2004 | Yamasaki et al. ...... 369/112.28 |

FOREIGN PATENT DOCUMENTS

| | | |
|---|---|---|
| JP | 08-102079 | 4/1996 |
| JP | 10-334500 | 12/1998 |
| JP | HEI 11-316965 | 11/1999 |
| JP | 2001-134972 | 5/2001 |

\* cited by examiner

*Primary Examiner*—Wayne Young
*Assistant Examiner*—Adam R. Giesy
(74) *Attorney, Agent, or Firm*—Christensen O'Connor Johnson Kindness PLLC (57) ABSTRACT

An optical pickup for performing data recording and reproduction with respect to both CDs and DVDs and a disk apparatus incorporating the optical pickup. The optical pickup comprises a CD laser diode and a DVD laser diode, and creates a composite CD/DVD laser beam using a composite prism. An optical film is formed on a composite plane of the composite prism to reduce concentration of the DVD laser beam in its central portion relative to that in its peripheral portion to thereby obtain characteristics of concentration distribution which is flatter than that of Gaussian distribution. For a composite prism of a type which transmits a CD laser beam and reflects a DVD laser beam, the optical film is adjusted such that a reflection rate of a DVD laser beam is minimized for a DVD laser beam incoming at an optical axis incident angle.

6 Claims, 9 Drawing Sheets

OPTICAL PICKUP AND OPTICAL DISK APPARATUS

BACKGROUND OF THE INVENTION

1. Field of the Invention

The present invention relates to an optical pickup and an optical disk apparatus and, in particular, to an optical pickup for performing data recording and reproduction with respect to both CDs and DVDs.

2. Description of the Related Art

Conventional CD drives perform data recording and reproduction with respect to CDs, while conventional DVD drives perform data recording and reproduction with respect to DVDs. In addition to these drives, recently developed optical disk drives can perform data recording and reproduction with respect to both CDs and DVDs. Such drives have two light sources, a laser diode for irradiating a CD with a beam of focused laser light (a CD laser beam 9), and a laser diode for irradiating a DVD with a DVD laser beam 11. A typical drive has a common optical system for use in irradiating laser beams to either CDs or DVDs.

Figure 6:
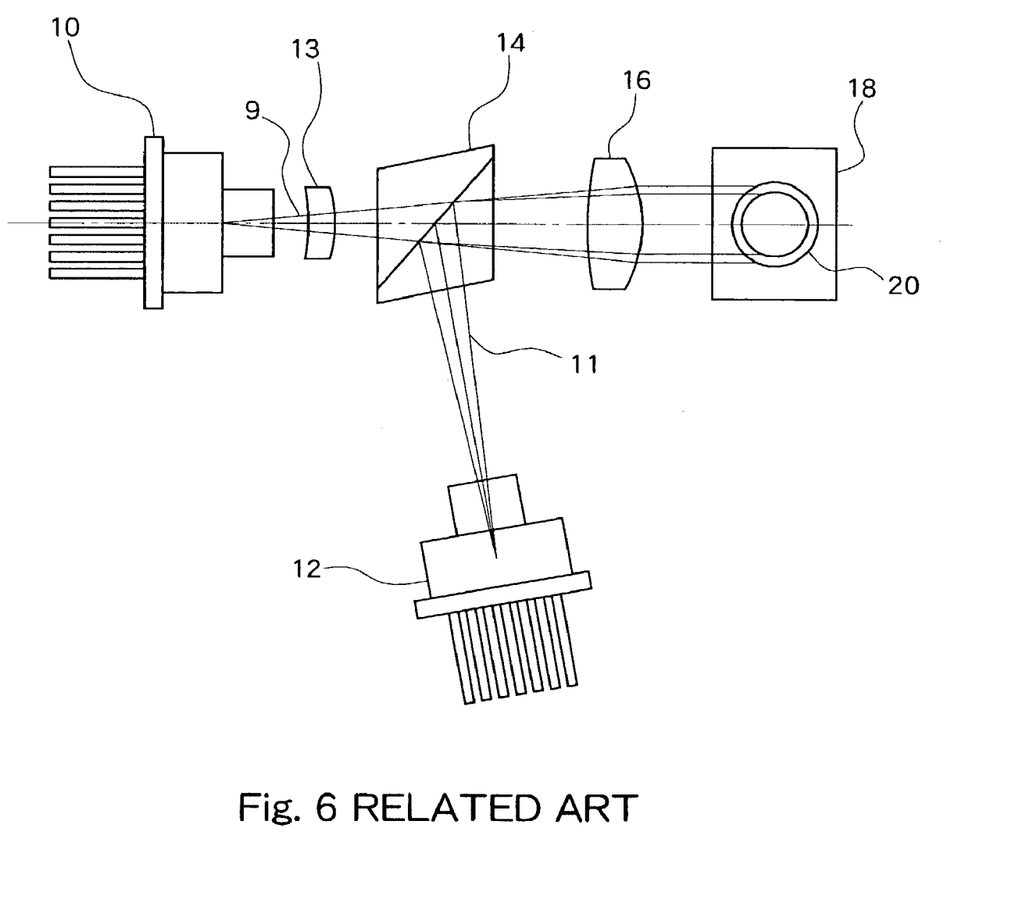
FIG. 6 is a diagram showing a structure of a conventional optical pickup.

FIG. 6 shows a structure of a conventional optical pickup for use in an optical disk apparatus. The optical pickup has a CD laser diode 10 for irradiation of a CD laser beam 9 and a DVD laser diode 12 for irradiation of a DVD laser beam. The CD laser diode 9 and the DVD laser beam 11 are introduced into a composite prism 14 which comprises two prisms which are attached to each other via one surface. The composite prism 14 transmits the incident CD laser beam 9 through the common surface and reflects the light of the DVD laser beam 11 incident the common surface. The transmitted CD laser beam 9 and the reflected DVD laser beam 11 from the composite prism 14 then proceed coaxially until they are introduced into a subsequent collimator lens 16. The collimator lens 16 collimates the incident CD laser beam 9 and DVD laser beam 11 and directs them to a mirror 18. The mirror 18 then reflects the CD laser beam 9 and the DVD laser beam 11 into an object lens 20 which is arranged perpendicular to a paper surface. The object lens 20 converges the incident CD laser beam 9 and DVD laser beam 11 for projection onto the surface of a CD or DVD.

Common use of the composite prism 14, the collimator lens 16, the mirror 18, and the object lens 20 in both CD and DVD systems can advantageously reduce the number of components and associated cost.

Such a drive must produce a spot having a small diameter for the DVD system. For this purpose, a larger magnification power must be employed to ensure larger peripheral concentration of the light incident to the object lens 20. An optical magnification power $1/\beta$ is given as follows:

$1/\beta$=(focal distance of the collimator lens)/(focal distance of the object lens 20)

Increasing the optical magnification power enables increasing the concentration of a laser beam along the periphery of the object lens, that is, RIM intensity. Accordingly, distribution of the concentration of a laser beam flattens the characteristics of the beam. Such characteristics enable further reduction of a spot diameter.

Figure 7A:
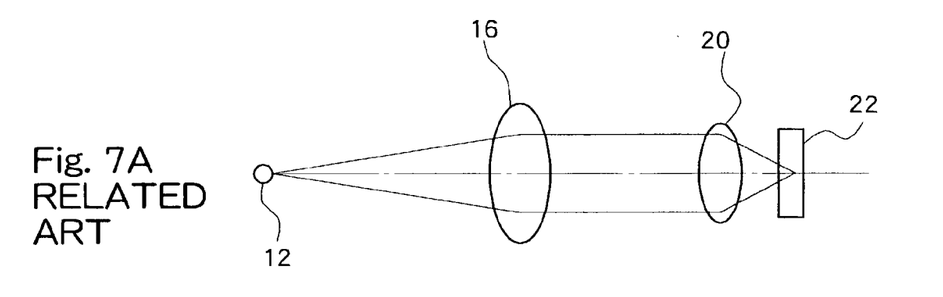
FIG. 7A is a diagram showing a structure of an optical system for the DVD laser beam of FIG. 6.
Figure 7B:
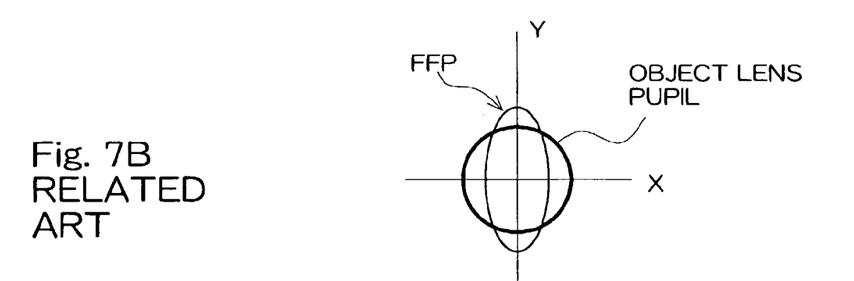
FIG. 7B is a graph showing an FFP for a lower optical magnification rate.
Figure 7C:
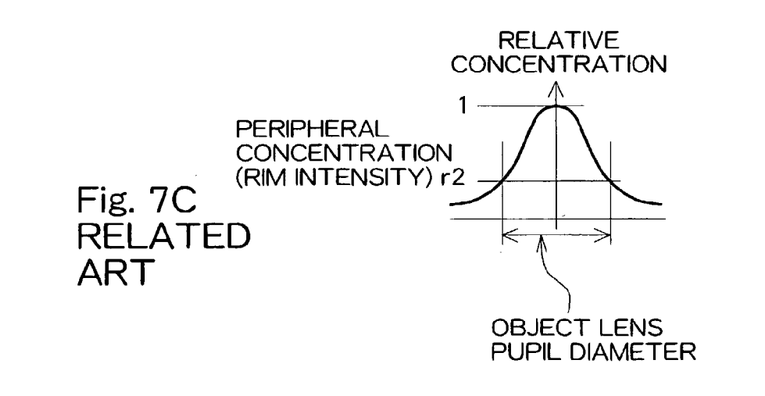
FIG. 7C is a graph showing rim intensity for a lower optical magnification rate.
Figure 8A:
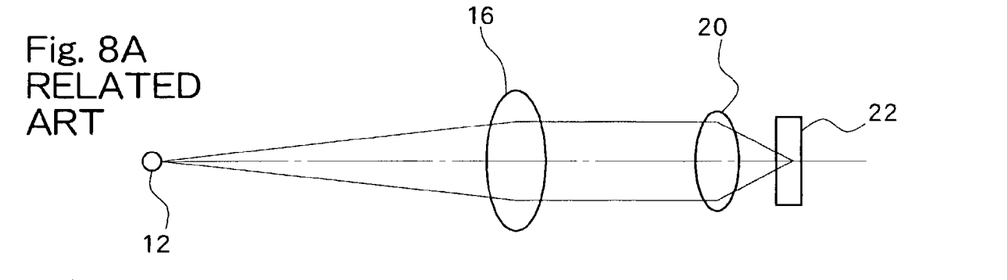
FIG. 8A is a diagram showing a structure of an optical system for the DVD laser beam of FIG. 6.
Figure 8B:
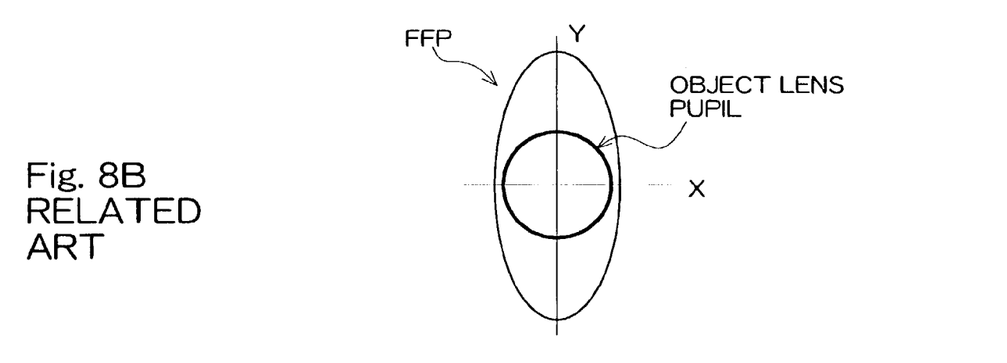
FIG. 8B is a graph showing an FFP for a higher optical magnification rate.
Figure 8C:
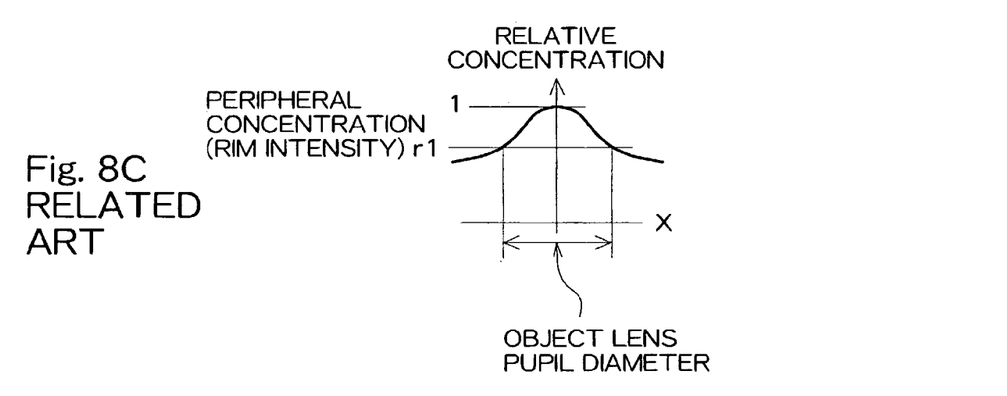
FIG. 8C is a graph showing rim intensity for a higher optical magnification rate.

FIGS. 7A to 7C and FIGS. 8A to 8C show far field patterns, or FFP, of light incident to the object lens 20 and the associated concentration distribution of the laser beam for higher and lower optical magnification powers. Specifically, FIGS. 7A and 8A show positional relationships among the laser diode 10 or 12 serving as a light source, the collimator lens 16, the object lens 20, and a CD or DVD disk 22. FIGS. 7B and 8B show an FFP relative to an object lens pupil. FIGS. 7C and 8C show distribution of concentration (intensity) of a laser beam relative to an object lens pupil. Here, the concentration distribution of a laser beam is expressed as a relative concentration distribution with concentration at the center of the lens being one.

As shown in FIG. 7B, a smaller optical magnification power causes light incident to an object lens to have a smaller FFP, and causes a large deviation in concentration distribution characteristics of the incident laser beam within a range corresponding to the diameter of the objective lens pupil, as shown in FIG. 7C. Specifically, the concentration of the incident light is greater at its center than at its periphery, which results in a spot having a larger diameter formed on a disk plane through conversion by the object lens 20.

A larger optical magnification power, on the other hand, produces a larger FFP, as shown in FIG. 8B. This can ensure larger peripheral concentration (rim intensity), such as r1 increased from r2, which results in flatter characteristics of concentration distribution of a laser beam.

As described above, in a conventional drive in which the diameter of a spot for the DVD system is set small, a higher optical magnification power is employed for the common optical system so as to accommodate the DVD system, such as five to six power for a DVD system as opposed to three to four power for a CD system. Further, such a conventional drive employs a longer focal distance for the collimator lens 16. However, increase of the focal distance of the collimator lens 16 results in increase of a distance between the DVD laser diode 12 serving as a light source and the collimator lens 16. This can cause problems such as enlargement of the entire size of the optical pickup.

Still further, because a CD system requires higher coupling efficiency for recording using a CD-R/RW, it is necessary to provide a coupling lens 13 on an optical path, as shown in FIG. 6, to correct the magnification power. This leads to additional disadvantages such as an increase in the number of components.

Alternatively, a correction filter may be provided on the optical path between the laser diode 12 and the composite prism 14 to therewith attain flatter characteristics of the concentration distribution of the DVD laser beam 11. Provision of such a filter allows use of a smaller magnification power, such as is appropriate for the CD system, for the common optical system and a shorter focal distance of the collimator lens 16 to thereby reduce a distance between the laser diode 12 and the collimator lens 16. This arrangement, however, is disadvantageous in that, for example, addition of a new optical component, that is, a filter, and increase of relevant costs.

Meanwhile, Japanese Patent Laid-open Publication No 2001-134972 discloses a structure in which a diffraction grating is provided in a window of a semiconductor laser module to therewith correct the characteristics of the concentration distribution of a laser beam. This arrangement, however, disadvantageously requires a dedicated semiconductor laser module which has a diffraction grating installed in the window, and leads to an increase in costs.

SUMMARY OF THE INVENTION

The present invention aims to provide an optical pickup and an optical disk apparatus which is smaller than a conventional device, and in which the size reduction is achieved without increasing the number of components.

According to the present invention, there is provided an optical pickup, comprising a CD laser beam source for irradiating a CD laser beam; a DVD laser beam source for irradiating a DVD laser beam; a composite prism for compositing the CD laser beam and the DVD laser beam to irradiate a composite laser beam coaxially along an optical axis; and a collimator lens for collimating the laser beam from the composite prism, wherein an optical film is formed on a composite plane of the composite prism, the optical film reducing concentration (intensity) of the center of the DVD laser beam relative to the concentration (intensity) of the periphery of said beam.

While distribution of concentration of a laser beam from a light source can generally be approximated by Gaussian distribution, according to the present invention, distribution characteristics of a DVD laser beam are corrected using the optical film formed on the composite plane of the composite prism, so as to present flatter characteristics. This correction enables conversion of a DVD laser beam into a spot having a sufficiently small diameter while employing a focal distance of the collimator lens which is suitable for a CD operation.

When the composite prism is of a type which transmits a CD laser beam and reflects a DVD laser beam, the optical film formed on the composite plane of the composite prism has reflection characteristics such that a reflection rate of a DVD laser beam is minimized for a DVD laser beam incoming at an angle formed by the optical axis of a DVD laser beam relative to the optical film and determined depending on the positional relationship between the light source and the composite plane, hereafter referred to as "an optical axis incident angle". With this arrangement, the concentration of the reflected DVD laser beam in its central portion (near the optical axis) is reduced, so that characteristics of the concentration distribution of the DVD laser beam become flatter than those of a Gaussian distribution.

When, on the other hand, the composite prism is of a type which reflects a CD laser beam and transmits a DVD laser beam, the optical film formed on the composite plane of the composite prism has transmission characteristics such that a transmission rate of a DVD laser beam is minimized for a DVD laser beam incoming at an optical axis incident angle. With this arrangement, concentration of the transmitted DVD laser beam at its central portion (near the optical axis) is reduced, so that characteristics of the concentration distribution of the DVD laser beam become flatter than those associated with a Gaussian distribution.

Minimization of the reflection or transmission rate of a DVD laser beam incoming at an optical axis incident angle is attained by utilizing multiple interference of a multi-layered optical film. Reflection or transmission characteristics of a multi-layered optical thin film can be desirably determined through adjustment of a refraction rate and thickness of each layer. It should be noted that an optical film of the present invention functions also as a dichroic film which selectively transmits or reflects an incident laser beam according to its wavelength. An optical film of the present invention can be described as a dichroic film which has a function of correcting concentration distribution of a DVD laser beam.

The present invention will be more clearly understood with reference to the following embodiments. These embodiments, however, are merely examples of the present invention, and the scope of the present invention is not limited to them.

DESCRIPTION OF THE PREFERRED EMBODIMENTS

In the following, embodiments of the present invention will be described with reference to the accompanying drawings.

Figure 1:
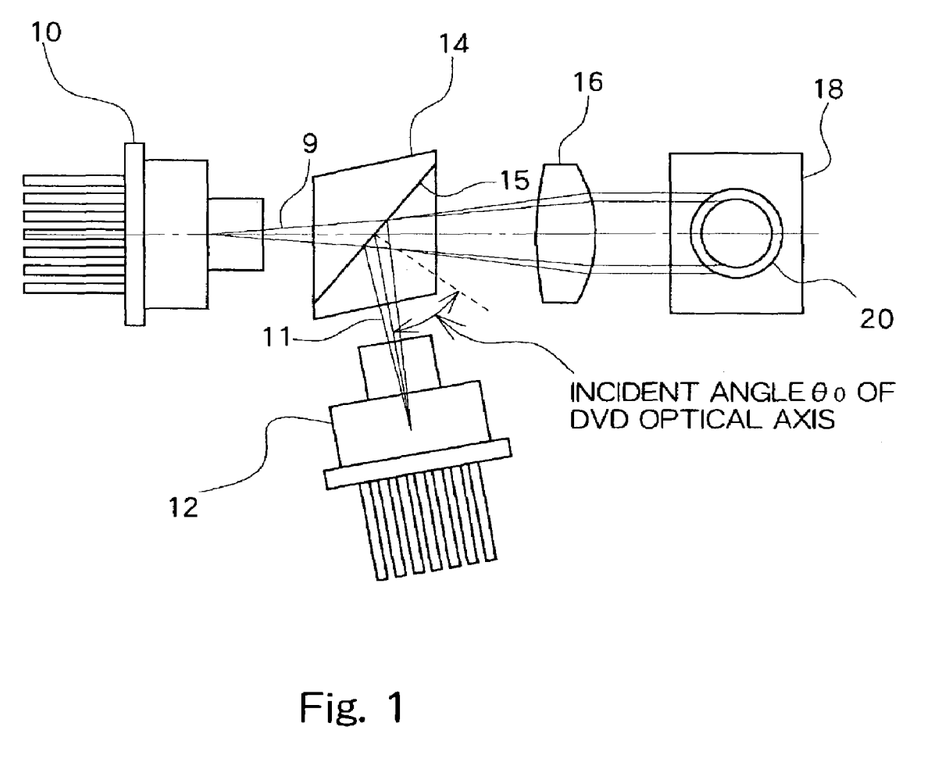
FIG. 1 is a diagram showing a structure of an optical pickup.

FIG. 1 shows a structure of an optical pickup in this embodiment. The optical pickup comprises a laser diode 10, a laser diode 12, and a composite prism 14. The composite prism 14 transmits a CD laser beam 9 having a wavelength of 780 nm and reflects a DVD laser beam 11 having a wavelength of 630 nm such that the transmitted CD laser beam 9 and the reflected DVD laser beam 11 are coaxially composite. The coaxially composite laser beam is then collimated by a collimator lens 16, and introduced into a mirror 18. The mirror 18 reflects the incident beam onto an object lens 20. The laser diode 10 and the laser diode 12 are each a hologram laser unit formed into a single module which additionally has an integrally formed signal detector.

The optical pickup in this embodiment differs from the conventional optical pickup shown in FIG. 6 in that (1) the magnification rate of the common optical system is set as three to four power, as is appropriate for the CD system, (2) a short focal distance is set for the collimator lens 16, as is appropriate for the CD system, (3) a shorter distance between the laser diode 12 and the collimator lens 16 is set according to the shorter focal distance, and (4) no coupling lens 13 is provided along the optical path between the laser diode 10 and the composite prism 14. These differences can be achieved by using a multi-layered optical thin film 15 which is formed on the composite plane (an attached plane) of the composite prism 14. The multi-layered optical thin film 15 may be formed through evaporation, sputtering, or other suitable process. Selection of material, more specifically, adjustment of a refraction rate and thickness, of each layer of the multi-layered optical thin film 15 makes it possible to achieve desired reflection or transmission characteristics.

Figure 2:
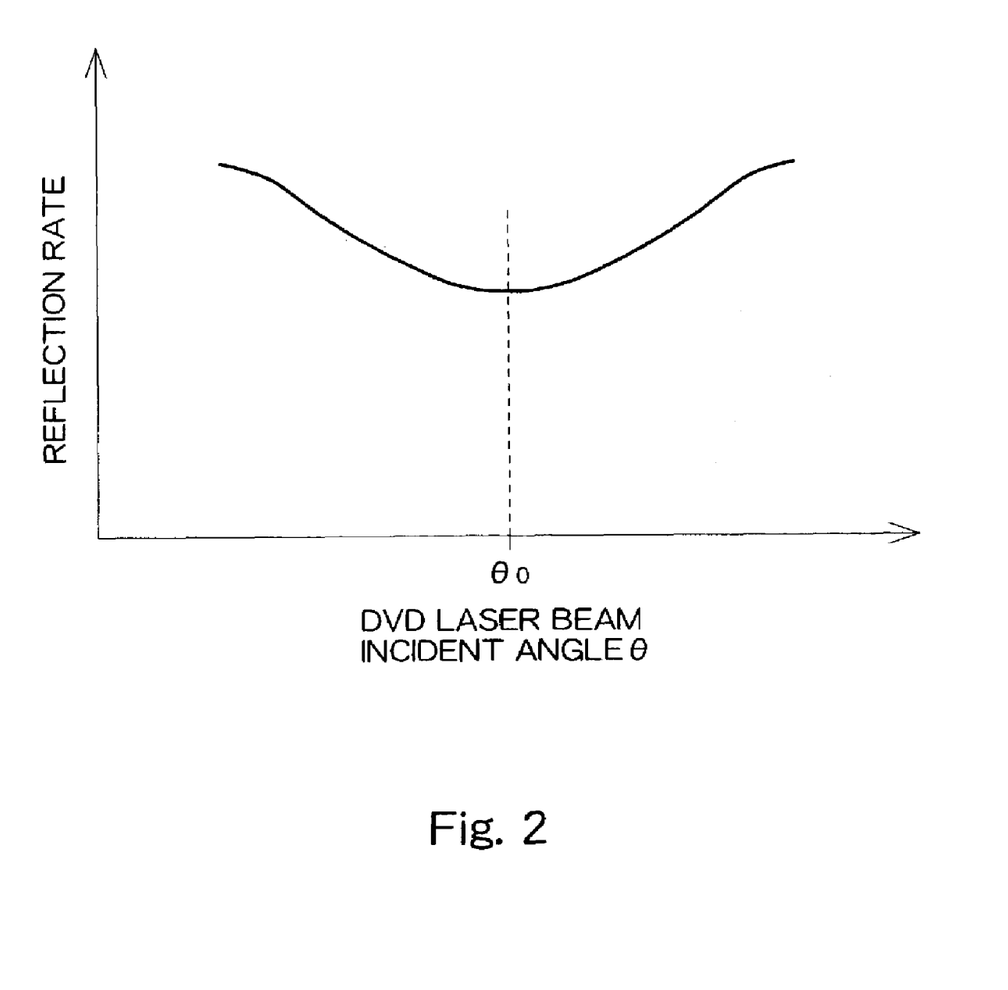
FIG. 2 is a graph showing reflection rate characteristics of the composite prism of FIG. 1.

FIG. 2 shows reflection characteristics of the multi-layered optical thin film 15 formed on the composite plane of the composite prism 14. In the drawing, the abscissa corresponds to an incident angle θ of the DVD laser beam 11, while the ordinate corresponds to a reflection rate. The multi-layered optical thin film 15 basically functions as a dichroic film which transmits a CD laser beam 9 having a wavelength of 780 nm and reflects a DVD laser beam 11 having a wavelength of 630 nm. The refraction rate and thickness of each layer constituting the multi-layered optical thin film 15 are adjusted such that a reflection rate of a DVD laser beam 11 is minimized for a DVD laser beam incoming at an incident angle θ0. An incident angle θ0 is an angle formed by the optical axis of a DVD laser beam 11 emitted from the DVD laser diode 12 relative to the composite plane of the composite prism 14.

With such characteristics that a reflection rate of a DVD laser beam 11 is minimized for a DVD laser beam incoming at an optical axis incident angle θ0, concentration of the central portion of the DVD laser beam 11 can be reduced, such that concentration of the central portion relative to that towards the periphery is reduced. This is achievable with the above-described arrangement because the incident angle of the central portion of the DVD laser beam 11 is substantially θ0, that is, an angle at which the reflection rate is minimized.

Figure 3A:
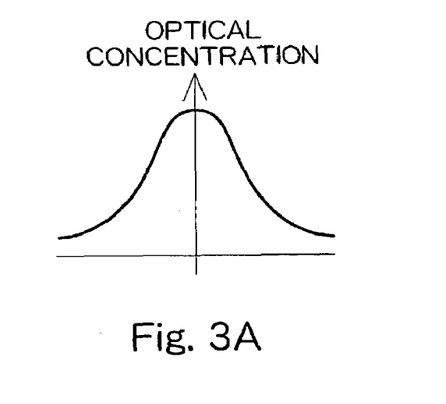
FIG. 3A is a graph showing concentration distribution of a DVD laser beam before introduction into a composite prism.
Figure 3B:
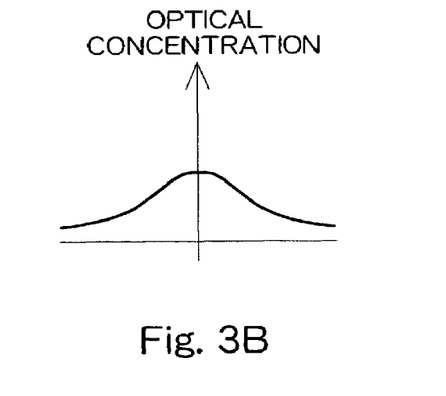
FIG. 3B is a graph showing concentration distribution of a DVD laser beam after reflection by the composite prism.
Figure 3C:
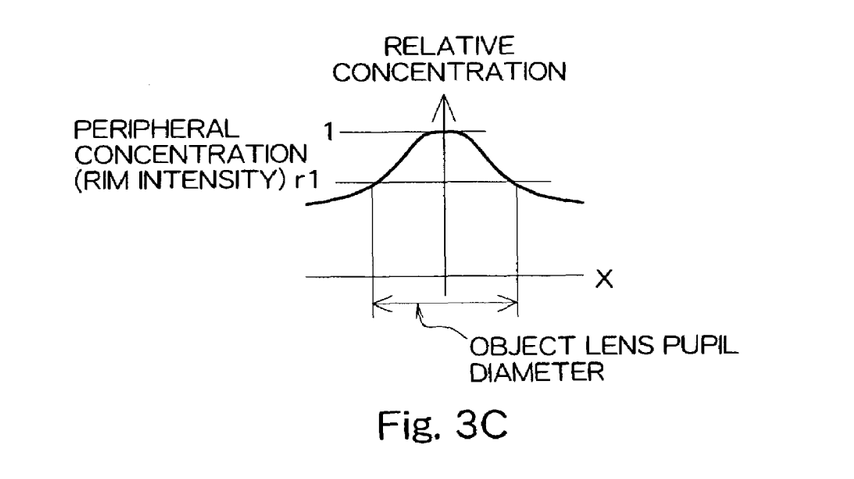
FIG. 3C is a graph showing rim intensity of a DVD laser beam after reflection by the composite prism.

FIGS. 3A to 3C show distribution of concentration of the DVD laser beam 11 in this embodiment. Specifically, FIG. 3A shows distribution of concentration of the DVD laser beam 11 emitted from the laser diode 12, which presents a substantial Gaussian distribution. FIG. 3B shows distribution of concentration of a DVD laser beam 11 reflected on the composite plane of the composite prism 14. With these distribution characteristics, concentration at the center of the DVD laser beam 11 is reduced relative to that at the periphery, which creates flatter concentration distribution characteristics than those illustrated in FIG. 3A.

With these flatter characteristics of the concentration distribution of the laser beam 11 incident to the collimator lens 16, larger peripheral concentration (rim intensity) of the objective lens 30 is ensured, as shown in FIG. 3C. It should be noted that concentration distribution of a laser beam shown in FIG. 3 is relative concentration distribution with concentration at the center of the lens as a reference value 1, and, therefore, reduction of the concentration at the center of the lens results in increase of peripheral concentration relative to that at the central portion of the lens. The large peripheral concentration enables sufficient reduction of the diameter (stop-down) of the DVD laser beam before irradiation onto a DVD surface, even through an optical magnification power is set to three to four power, as is appropriate for a CD system.

Further, in this embodiment, a distance between the laser diode 12 and the collimator lens 16 can be reduced. This reduction, together with obviation of the coupling lens 13, enables effective reduction of the entire size of the optical pickup.

Still further, because formation of a multi-layered optical thin film 15 is the sole requirement to be accomplished in this embodiment, the embodiment makes possible use, without modification, of an off-the-shelf, general-purpose laser diode.

Figure 4:
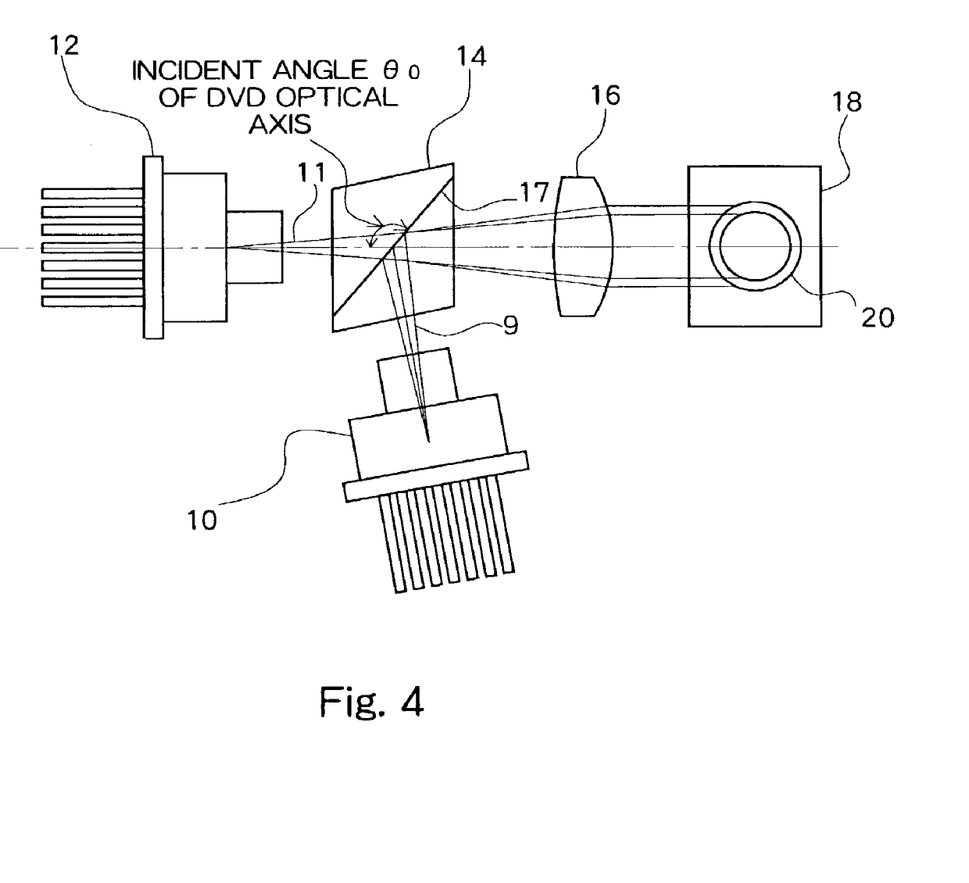
FIG. 4 is a diagram showing another structure of an optical pickup.

FIG. 4 shows another structure of an optical pickup. In this embodiment, the composite prism 14 reflects a CD laser beam 9 from the CD laser diode 10 and transmits a DVD laser beam 11 from the DVD laser diode 12. The reflected CD laser beam 9 and the transmitted DVD laser beam 11 are introduced into the collimator lens 16. A multi-layered optical thin film 17 is formed on the composite plane of the composite prism 14 for correcting characteristics of the concentration distribution of the DVD laser beam 11. This correction is specifically made so that a transmission rate of the DVD laser beam 11 in its central portion is made smaller that that at its periphery, to thereby attain flatter characteristics of concentration distribution.

Figure 5:
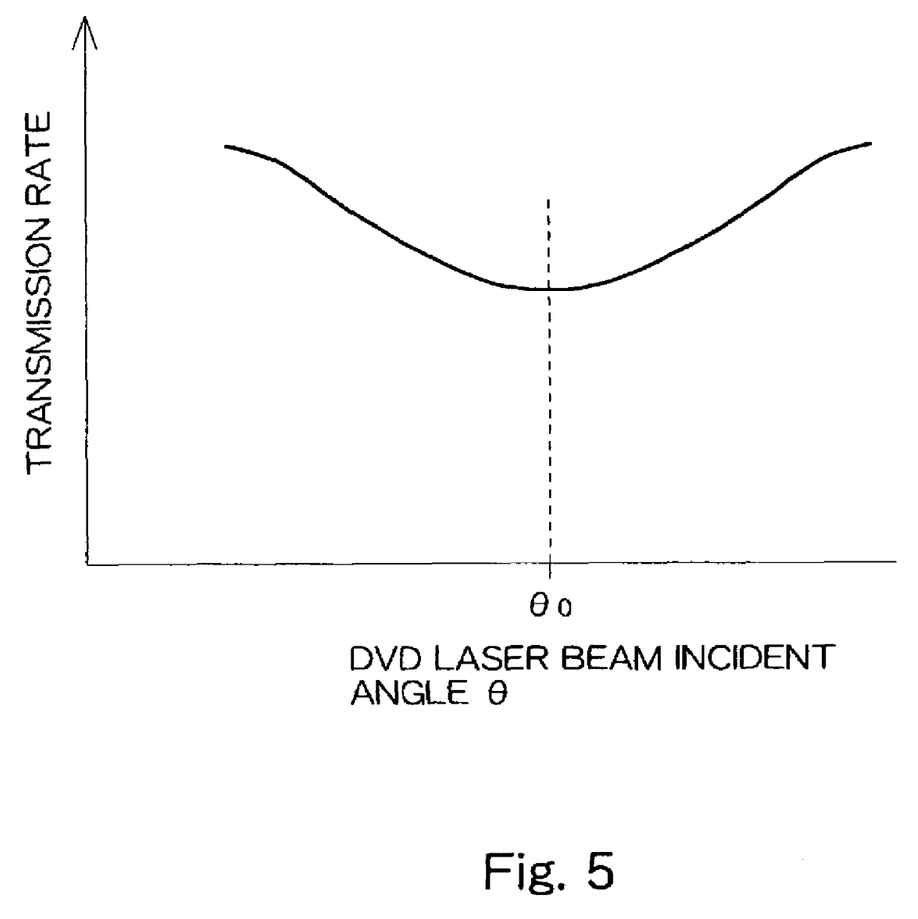
FIG. 5 is a graph showing transmission rate characteristics of the composite prism of FIG. 4.

FIG. 5 shows characteristics of the multi-layered optical thin film 17 in the optical pickup of FIG. 4. In the drawing, the abscissa corresponds to an incident angle θ of the DVD laser beam 11, while the ordinate corresponds to a transmission rate. The multi-layered optical thin film 17 basically functions as a dichroic film which reflects a CD laser beam 9 and transmits a DVD laser beam 11, and has characteristics such that a transmission rate of a DVD laser beam 11 is minimized for a DVD laser beam incoming at an incident angle θ0. An incident angle θ0 is an angle formed by the optical axis of the DVD laser beam 11 relative to the composite plane. With these characteristics, concentration (intensity) of the DVD laser beam 11 in its central portion relative to that in its peripheral (rim) portion can be reduced.

This embodiment also allows employment of a smaller magnification rate for the common optical system, such as three to four power, as is appropriate for a CD system, and reduces the focal distance of the collimator lens 16 and accordingly a distance between the laser diode 12 and the collimator lens 16. As a result, the entire size of the optical pickup can be reduced. Further, because the common optical system is set so as to be appropriate for the CD system, the coupling lens 13 to correct the CD laser beam 9 is unnecessary.

Figure 9:
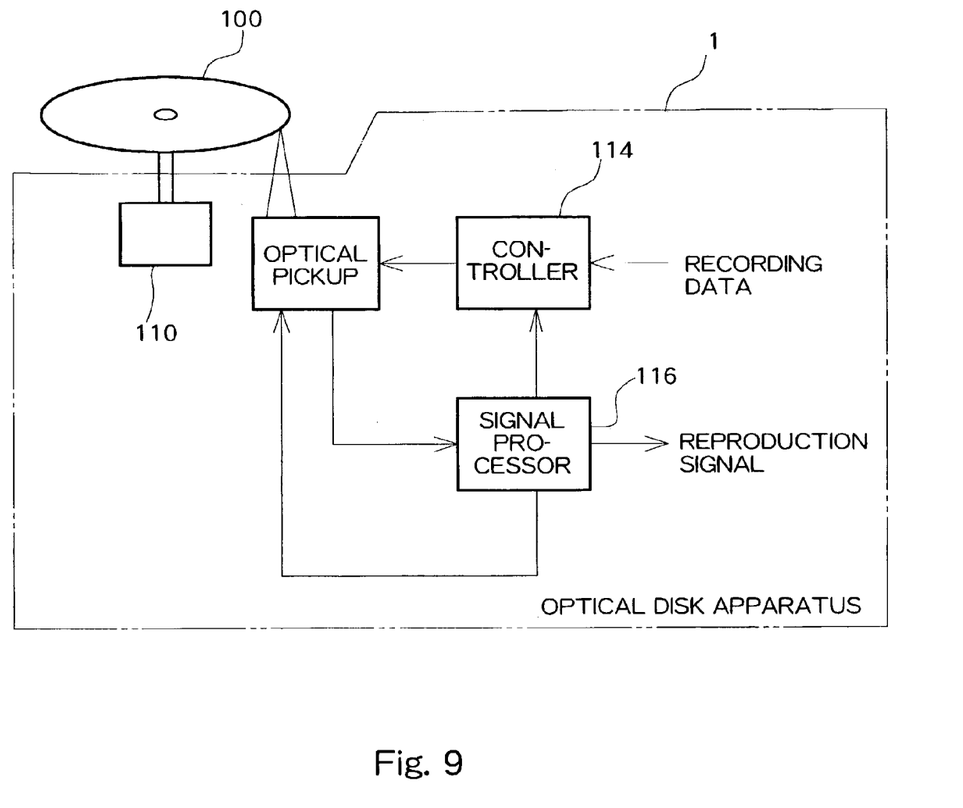
FIG. 9 is a block diagram showing a structure of an optical disk apparatus having the optical pickup of FIG. 1 or FIG. 4.

FIG. 9 is a diagram schematically showing a structure of an optical disk apparatus (drive) 1 which incorporates the optical pickup in this embodiment. As the schematic structure of this apparatus is similar to that of a conventional optical disk apparatus, the optical pickup according to this embodiment can be incorporated into a conventional optical disk apparatus without modification of the pickup or the apparatus. An optical disk 100, such as a CD, a DVD, and so forth, is driven to rotate by a spindle motor 110. The optical pickup as shown in FIG. 1 or 4 is installed as opposed to the optical disk 100. The optical pickup is driven in a radial direction of the optical disk 100 by a sled motor, not shown.

For data recording, a controller 114 outputs a recording signal to the optical pickup based on a command and recording data supplied from a host device such as a personal computer, and a recording laser beam 9, 11 is irradiated onto an optical disk 100. For data reproduction, on the other hand, a reproducing laser beam 9, 11 is output to the optical disk 100, and a signal from the optical pickup is decoded in a signal processor 116 and supplied as a reproduction signal to the host device.

Identification data which is recorded in advance on the optical disk 100 is read out and supplied from the signal processor 116 to the controller 114, so that the controller. 114 determines whether or not the optical disk 100 is a CD or a DVD. For determination that the installed optical disk 100 is a CD, a CD laser diode 10 of the optical pickup is driven. For determination that a DVD optical disk 100 is a DVD, a DVD laser diode 12 of the optical pickup is driven.

It should be noted that the present invention is not limited to the above described embodiments and allows for various modifications. For example, whereas reflection or transmission characteristics of the DVD laser beam 11 are adjusted using the multi-layered optical thin film 15, 17 formed on the composite plane of the 14 so as to obtain flatter concentration distribution characteristics in the above embodiment, a second optical thin film which transmits or reflects a CD laser beam 9 may be additionally formed on the composite plane.

Alternatively, an optical film having transmission characteristics such that a transmission rate of a DVD laser beam 11 is minimized for a DVD laser beam incoming at an optical axis incident angle may be additionally provided on the side of a plane of the composite prism 14, via which the DVD laser beam 11 is introduced.

What is claimed is:

1. An optical pickup, comprising:
   a CD laser beam source for irradiating a CD laser beam;
   a DVD laser beam source for irradiating a DVD laser beam;
   a composite prism for transmitting the CD laser beam, reflecting the DVD laser beam, and creating a composite of the transmitted CD laser beam and the reflected DVD laser beam to irradiate the composite laser beam coaxially along an optical axis; and
   a collimator lens for collimating the laser beam from the composite prism,
   wherein an optical film is formed on a composite plane of the composite prism, the optical film having reflection characteristics such that a reflection rate of the DVD laser beam is minimized for a DVD laser beam incoming at an optical axis incident angle, and that concentration of the DVD laser beam at a central portion relative to the concentration of the DVD laser beam at a peripheral portion is reduced.

2. The optical pickup according to claim 1, wherein the focal distance of the collimator lens is determined according to the CD laser beam.

3. An optical disk apparatus, comprising:
   the optical pickup according to claim 1; and
   a controller for driving the CD laser beam source of the optical pickup when an optical disk is a CD, and driving the DVD laser beam source of the optical pickup when the optical disk is a DVD.

4. An optical pickup, comprising:
   a CD laser beam source for irradiating a CD laser beam;
   a DVD laser beam source for irradiating a DVD laser beam;
   a composite prism for reflecting the CD laser beam, transmitting the DVD laser beam, and creating a composite of the reflected CD laser beam and the transmitted DVD laser beam to irradiate the composite laser beam coaxiatly along an optical axis; and
   a collimator lens for collimating the laser beam from the composite prism,
   wherein an optical film is formed on a composite plane of the composite prism, the optical film having transmission characteristics such that a transmission rate of the DVD laser beam is minimized for a DVD laser beam incoming at an optical axis incident angle, and that concentration of the DVD laser beam at a central portion relative to the concentration of the DVD laser beam at a peripheral portion is reduced.

5. The optical pickup according to claim 4, wherein the focal distance of the collimator lens is determined according to the CD laser beam.

6. An optical disk apparatus, comprising:
   the optical pickup according to claim 4; and
   a controller for driving the CD laser beam source of the optical pickup when an optical disk is a CD, and driving the DVD laser beam source of the optical pickup when the optical disk is a DVD.

* * * * *